United States Patent
Hwang et al.

[11] Patent Number: 5,986,406
[45] Date of Patent: Nov. 16, 1999

[54] ELECTRIC FIELD NOISE ELIMINATING CIRCUIT IN A VIDEO DISPLAY APPLIANCE

[75] Inventors: Dong Sun Hwang; Gun Su Song, both of Kyoungsangbuk-Do, Rep. of Korea

[73] Assignee: LG Electronics Inc., Seoul, Rep. of Korea

[21] Appl. No.: 09/023,875

[22] Filed: Feb. 13, 1998

[30] Foreign Application Priority Data

Feb. 15, 1997 [KR] Rep. of Korea .......................... 97-4558
Apr. 22, 1997 [KR] Rep. of Korea .................... 97-8412 U

[51] Int. Cl.$^6$ .................................................. H05B 37/02
[52] U.S. Cl. .................................. 315/85; 315/8; 361/149
[58] Field of Search ................................ 315/8, 85, 370; 348/819, 820; 361/139, 149, 150

[56] References Cited

U.S. PATENT DOCUMENTS

| 5,151,635 | 9/1992 | Cappels ..................................... 315/370 |
| 5,243,262 | 9/1993 | Moen ....................................... 315/370 |
| 5,404,084 | 4/1995 | Onodera et al. ........................... 315/370 |
| 5,563,476 | 10/1996 | Smith et al. ................................ 315/8 |
| 5,726,538 | 3/1998 | Jackson et al. .............................. 315/8 |

FOREIGN PATENT DOCUMENTS

| 92301371 | 2/1992 | European Pat. Off. . |
| 2273230 | 12/1992 | United Kingdom . |
| 2306872 | 10/1996 | United Kingdom . |
| 2313279 | 5/1997 | United Kingdom . |

OTHER PUBLICATIONS

IBM Technical Disclosure Bulletin vol. 3, No. ? May 1988 pg. 9 & 10.

*Primary Examiner*—Michael B Shingleton
*Attorney, Agent, or Firm*—Oppenheimer Wolff & Donnelly LLP

[57] ABSTRACT

The present invention relates to a circuit for eliminating radiated electric field noise in a video appliance which can completely offset radiated electric field noise generated on the front face of the CRT by variably adjusting and applying the waveform signal, the amplitude and phase of which are opposite to those of the radiated electric field noise formed on the front face of the CRT. The circuit for eliminating radiated electric field noise according to the present invention includes a high voltage ripple offset section including a cylindrical core, wherein a high voltage lead wire of the FBT passes through the cylindrical core, for eliminating a ripple component of the high voltage applied to the anode of the CRT according to the negative polarity pulse signal from the FBT induction coil, and an electric field noise offset section operable to offset the radiated electric field noise generated from the front face of the CRT by applying the negative polarity pulse signal to the periphery of the CRT.

12 Claims, 5 Drawing Sheets

ELECTRIC FIELD NOISE ELIMINATING CIRCUIT IN A VIDEO DISPLAY APPLIANCE

BACKGROUND OF THE INVENTION

1. Field of the Invention

The present invention relates to a circuit for eliminating radiated electric field noise in a video appliance, and more particularly to a circuit for eliminating radiated electric field noise in a video appliance which can eliminate noise of the radiated electric field generated from the front face of a cathode ray tube (CRT).

2. Description of the Prior Art

In general, a video appliance employing a CRT emits electron beams through an electron gun in order to display images on the CRT screen. Magnetic field of a deflection yoke mounted on the neck of the CRT (not illustrated in the drawings) is utilized to control emitting direction of the electron beams for an appropriate positioning on the screen. If electric current is to be flown through a deflection yoke to generate such magnetic field, however, electric field is also generated. Accordingly, a great amount of electronic wave is always generated around the periphery of the monitor. As a consequence, a video appliance normally requires an apparatus for eliminating the electronic wave in a video appliance.

FIG. 1 shows a circuit for eliminating electronic wave in a video appliance.

Referring to FIG. 1, the circuit for eliminating electronic wave comprises: a horizontal driving pulse generation section 70 for generating a horizontal driving pulse signal according to the horizontal synchronous signal inputted from the PC (not illustrated in the drawing); a flyback transformer 72 for generating a high voltage according to a horizontal driving pulse signal of the horizontal driving pulse generation section 70, and supplying the high voltage to an anode of a CRT 71; an electro-magnetic wave offset section 74 for correcting waveform of the negative polarity pulse signal applied from the induction coil 73 integrally wound at a predetermined number with the flyback transformer 72; and a lead wire 75 for offsetting an electromagnetic wave generated from the front face of the CRT 71 according to the negative polarity pulse signal of the offset section 74.

The lead wire 75 is wound at least once along the external periphery of the CRT, at which a bezzle section is positioned, with no closing loop being formed.

The horizontal driving pulse generation section 70 comprises a transistor Q switched according to the horizontal synchronous signal inputted from the PC, and a deflection coil DY generated from the neck of the CRT 71 for deflecting the electrons on the screen of the CRT 71.

A capacitor C1 and a diode D1 are connected in parallel between the collector terminal of the transistor Q and the deflection coil. A capacitor C2 is connected to the other end of the deflection coil DY. An anode of the CRT 71 is connected to the secondary primary winding of the flyback transformer 72 via a diode D2.

The electro-magnetic wave offset section 74 includes a resistor R1 and a resistor R2 connected to one end of the induction coil 73 for dividing the voltage to level-adjust the negative polarity pulse signal applied by the induction coil 73. A capacitor C3 for correcting the waveform of the negative polarity pulse signal and a resistor R3 are connected in parallel to the other end of the resistor R1. A capacitor C4 and a resistor R4 are connected between the resistor R3 and the lead wire 75 for eliminating spike-like noise of the negative polarity pulse signal.

The reference $C_{HV}$ denotes a capacitor.

The conventional circuit for eliminating electronic wave in a video appliance operates as follows.

If a power supply is applied to a primary winding of the flyback transformer 72, and a horizontal synchronous signal is inputted to the base terminal of the transistor Q of the horizontal driving pulse generation section 70 from the PC, the transistor Q1 drives the flyback transformer 72. In other words, if the transistor Q is switched on/off, the flyback transformer 72 induces and applies the high voltage to the anode of the CRT 71.

The voltage at the primary winding of the flyback transformer 72 is inputted to the deflection coil DY as the transistor Q is switched on. Accordingly, deflected electric current flows through the deflection coil DY to deflect the electron beams emitted through the electron gun.

The negative polarity pulse voltage Va induced at the secondary winding of the flyback transformer 72, as expressed in the following equation 1, is divided by a predetermined voltage $B^+$ and the resistors R1, R2 to be level-adjusted.

$$Va = \frac{R1}{R1+R2}*B^+ + \frac{R2}{R1+R2}*\text{negative pulse} \qquad \text{Equation 1}$$

The amplitude and level of the DC of the negative polarity pulse voltage Va can be adjusted according to the values of the resistors R1, R2. The waveform of the negative polarity pulse voltage Va divided by the resistors R1, R2 is corrected by the resistor R3 and the capacitor C4 of the electro-magnetic wave offset section 74. The negative polarity pulse voltage Va, the waveform of which has been corrected by the resistor R3 and the capacitor C4, is inputted to the lead wire 75 after the spike-like noise is eliminated by the resistor R4 and the capacitor C4.

The lead wire 75 induces only a predetermined voltage on the front face of the CRT 71 without inducing the electric current component of the inputted negative polarity pulse signal Va on the front face of the CRT 71. Accordingly, the radiated electric field wave emitted through the front face of the CRT 71 is offset by the negative polarity pulse voltage Va of the lead wire 75, the amplitude of which is the same thereas but the phase of which is opposite thereto.

However, such a conventional circuit for eliminating electronic wave in a video appliance has a disadvantage that it fails to completely eliminate the radiated electric field noise generated from the front face of the CRT 71. Also, whereas the scale and waveform of the noise of the radiated electric field generated from the front face of the CRT 71 are variable, no amplitude control means has yet been available to generate the negative polarity pulse voltage in conformity with the scale of the noise of the radiated electric field emitted from the front face of the CRT 71. Thus, the noise of the radiated electric field induced to the CRT 71 cannot be completely offset, thereby failing to satisfy the standard required by the Swedish Confederation of Professional Employees (TCO).

SUMMARY OF THE INVENTION

To solve the above problems, the object of the present invention is to provide a circuit for eliminating radiated electric field noise generated from the front face of the CRT in a video appliance which can notably improve the shielding of the electronic wave by variably control and induce the waveform signal, the polarity of which is opposite thereto, so that the noise of the radiated electric field generated from the front face of the CRT can be completely offset.

Another object of the present invention is to provide a circuit for eliminating radiated electric field noise in a video appliance which can maintain purity of the video appliance on an optimal condition by reducing electronic wave generated around the video appliance.

According to one aspect of the present invention, there is provided a circuit for eliminating radiated electric field noise in a video appliance, comprising:

a high voltage ripple offset section including a cylindrical core, wherein a high voltage lead wire of the FBT passes through the cylindrical core, for eliminating a ripple component of the high voltage applied to the anode of the CRT according to the negative polarity pulse signal from the FBT induction coil; and an electric field noise offset section operable to offset the radiated electric field noise generated from the front face of the CRT by applying the negative polarity pulse signal to the periphery of the CRT.

According to another aspect of the present invention, there is provided a circuit for eliminating radiated electric field noise in a video appliance, comprising:

an amplitude control section for differentiating the negative polarity pulse signal applied from the FBT induction coil, and controlling the differentiated negative polarity pulse signal to have substantially the same amplitude as that of the radiated electric field noise formed on the front face of the CRT;

a high voltage ripple offset section for correcting the waveform of the negative polarity pulse signal inputted by the amplitude control section to have substantially the same phase as that of the ripple component of the radiated electric field noise generated on the front face of the CRT; and a lead wire for offsetting the radiated electric field noise induced on the front face of the CRT according to the negative polarity pulse signal of the high voltage ripple offset section.

BRIEF DESCRIPTION OF THE DRAWINGS

The above objects, other characteristics and advantages of the present invention will become more apparent by the following explanation with reference to the accompanying drawings, in which.

DETAILED DESCRIPTION OF THE EMBODIMENTS

Figure 1:
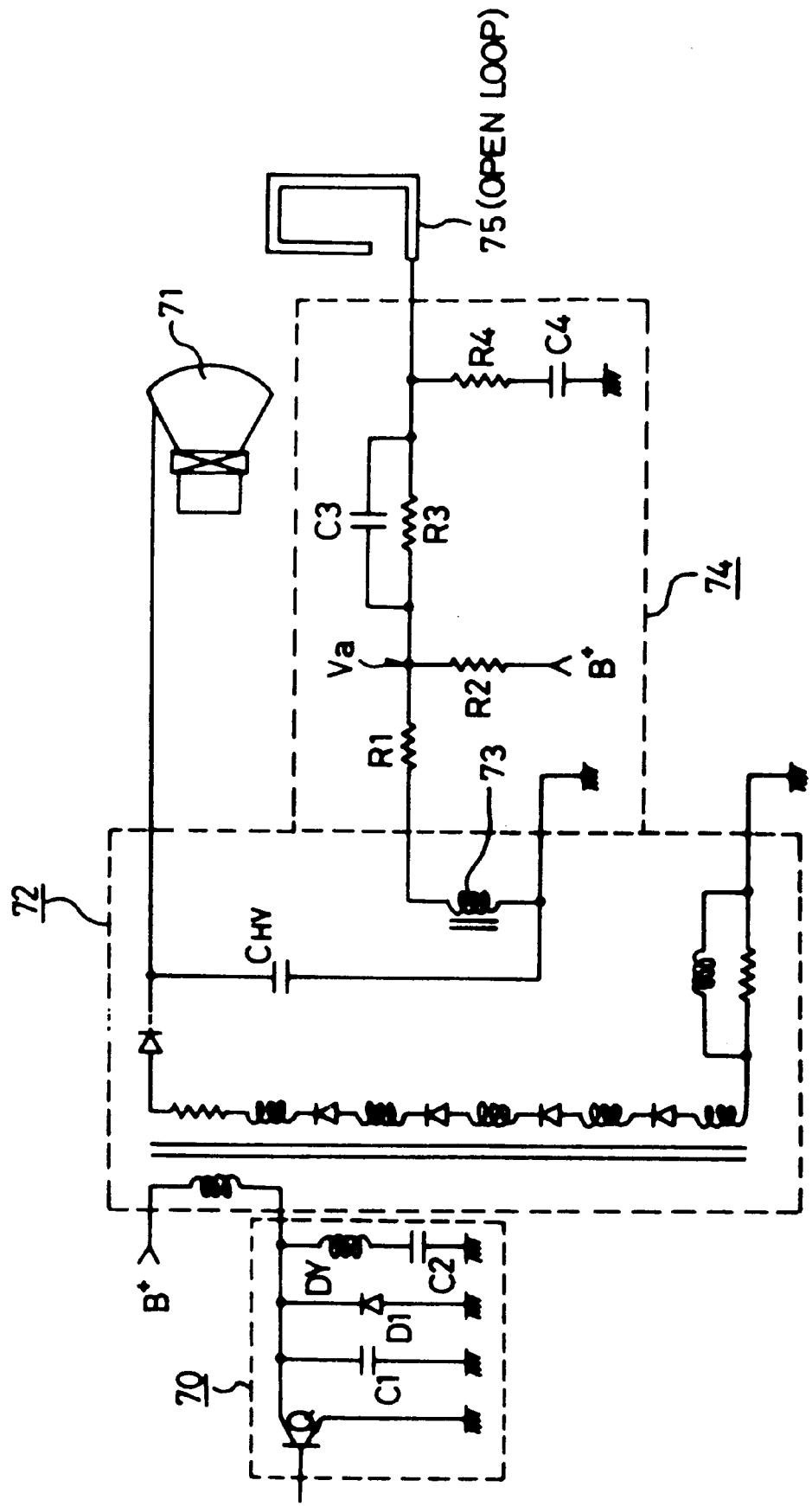
FIG. 1 is a diagram illustrating the conventional circuit for eliminating radiated electric field noise of the front face of a video appliance.
Figure 2:
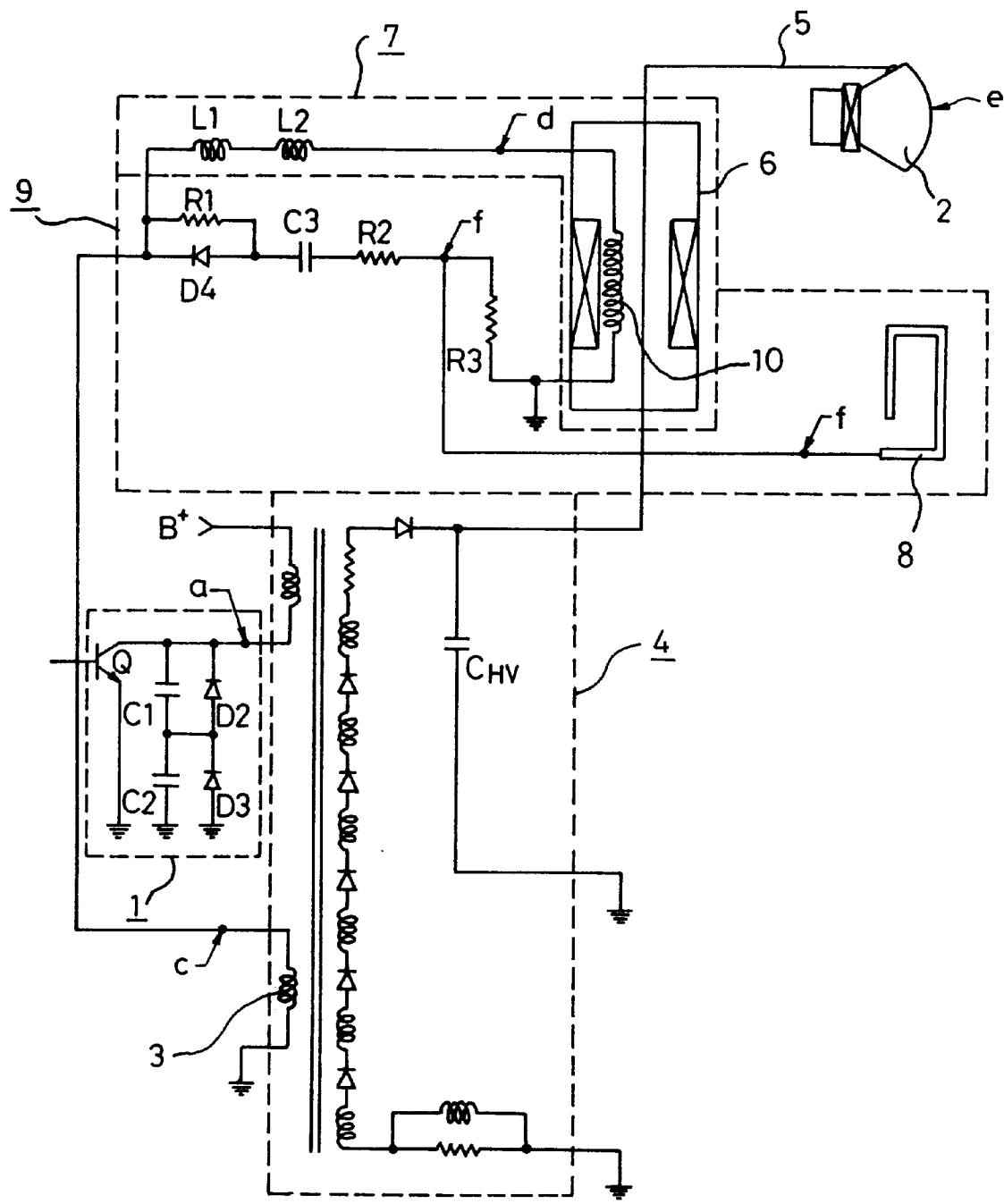
FIG. 2 is a diagram illustrating a circuit for eliminating radiated electric field noise in a video appliance according to an embodiment of the present invention.

FIG. 2 is a diagram illustrating a circuit for eliminating radiated electric field noise of the front face in a video appliance according to an embodiment of the present invention.

Referring to FIG. 2, the circuit for eliminating radiated electric field noise of the front face in a video appliance according to an embodiment of the present invention comprises: a horizontal driving pulse generation section 1 for generating a horizontal driving pulse signal according to a horizontal synchronous signal inputted from a PC (not illustrated in the drawing); a flyback transformer 4 for generating a high voltage according to the horizontal driving pulse signal of the horizontal driving pulse generation section 1, and supplying the high voltage to an anode of a CRT 2 to induce a negative polarity pulse signal from an induction coil 3 wound at a predetermined number around a cylindrical core 6 of the flyback transformer 4; a high voltage ripple offset section 7 for forming a high voltage lead wire 5 at the flyback transformer 4 to penetrate the cylindrical core 6, and eliminating the ripple component of the high voltage applied to the anode of the CRT 2 through the cylindrical core 6 according to the negative polarity pulse signal induced by the induction coil 3; and an electric field noise offset section 9 for offsetting the radiated electric field noise generated from the front face of the CRT 2 by utilizing a lead wire 8 wound at least once according to the negative polarity pulse signal applied from the induction coil 3 of the flyback transformer 4.

A transistor Q switched according to the horizontal synchronous signal inputted from the PC to the primary winding coil of the flyback transformer 4 is connected to the horizontal driving pulse generation section 1. Capacitors C1, C2 and diodes D2, D3 are connected in parallel between a collector terminal of the transistor Q and the flyback transformer 4.

The high voltage ripple offset section 7 includes voltage division coils L1, L2 connected between one end of the induction coil 3 and an offset coil 10 of the cylindrical core 6 to level-adjust the negative polarity pulse signal.

A resistor R1 and a diode D4 are connected to the electric field noise offset section 7 to apply the negative polarity pulse signal to one end of the offset coil 10. A capacitor C3 differentiating the negative polarity pulse signal and a resistor R2 are connected to the other end of the resistor R1. A resistor R3 is connected between the capacitor C3 and the offset coil 10 to control gain of the negative polarity pulse signal.

The offset coil 10 is wound several times or scores around a half of the cylindrical core 6, and a high voltage lead wire 5 of the flyback transformer 4 penetrates the cylindrical core 6. The lead wire 8 is wound at least once along the external periphery of the CRT, adjacent to which a bezzle section is positioned, with no closing loop being formed.

The drawing reference $C_{HV}$ denotes a capacitor.

Operation of the circuit constituted above according to an embodiment of the present invention will now be explained with reference to FIG. 2.

Figure 3A:
FIGS. 3A to 3F are diagrams illustrating waveforms of the output from each section of the circuit in FIG. 2.
Figure 3B:
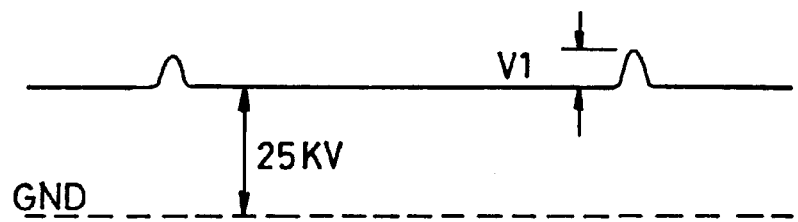

If a power supply is applied to the primary winding at the flyback transformer 4, and a horizontal synchronous signal is inputted from the PC to the base terminal at the transistor Q of the horizontal driving pulse generation section 1, the transistor Q inputs the horizontal pulse waveform to the flyback transformer 4 as illustrated in FIG. 3A. The flyback transformer 4 subsequently induces a high voltage according to the on/off switching of the transistor Q as illustrated in FIG. 3B.

The high voltage induced by the flyback transformer 4 passes through the diode D1 and a high voltage capacitor $C_{HV}$, and penetrates the cylindrical core 6 to be applied to the anode of the CRT 2. Then, the CRT 2 performs an operation to display a video signal according to the inputted high voltage.

If the capacitance value of the high voltage capacitor $C_{HV}$ is infinite, the high voltage has a predetermined DC value with no ripple component. Since the actual capacitance value is approximately 3,000 pF or 4,000 pF, however, the high voltage lead wire 5 of the flyback transformer, through which the high voltage passes, contains a ripple component V1 in addition to the DC component when applied to the anode of the CRT 2. Because of the high voltage containing the ripple component V1, radiated electric field noise of several hundred mV is induced to the front or rear face of the CRT 2 as a pulse V3 having the waveform as illustrated in FIG. 3E.

Figure 3C:
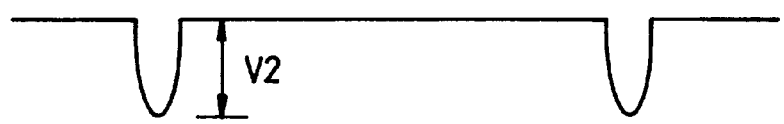
Figure 3D:
Figure 3E:
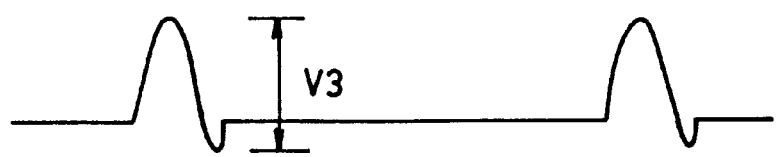

At the same time, a negative polarity pulse signal V2 is induced by the induction coil 3 wound at the secondary winding of the flyback transformer 4 as illustrated in FIG. 3C. The induced negative polarity pulse signal is inputted to the offset coil 10 wound around the cylindrical core 6 as a waveform V2' as illustrated in FIG. 3D via voltage division coils L1, L2. Since the phase of the inputted negative polarity pulse signal V2' is formed opposite to that of the ripple component induced to the high voltage lead wire of the flyback transformer 4, the ripple component contained in the high voltage penetrating the cylindrical core 6 is partially eliminated by the negative polarity pulse signal generated from the offset coil 10 of the cylindrical core 7. The amplitude of the negative polarity pulse signal can be adjusted by adjusting the reactance value of the voltage division coils L1, L2.

Figure 3F:
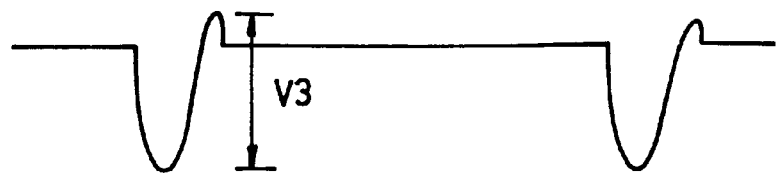

The negative polarity pulse signal induced by the induction coil 4 is inputted to the capacitor C3, which is a differentiating circuit, and the resistor R2. The negative polarity pulse signal is subsequently differentiated by the capacitor C3 and the resistor R2, and the waveform thereof is applied to the lead wire 8 as illustrated in FIG. 3F. Since the lead wire 8 wound at least once is open-looped, only the voltage component without the current component of the inputted negative polarity pulse signal is applied to the front face of the CRT 2. Accordingly, the electric field emitted through the front face of the CRT 2 as illustrated in FIG. 3F is offset by the negative polarity pulse signal (as illustrated in FIG. 3F), the amplitude of which is the same thereas but the phase of which is opposite thereto.

The resistors R2 and R3 can control the amplitude of the negative polarity pulse signal flowing to the lead wire 8.

Figure 4:
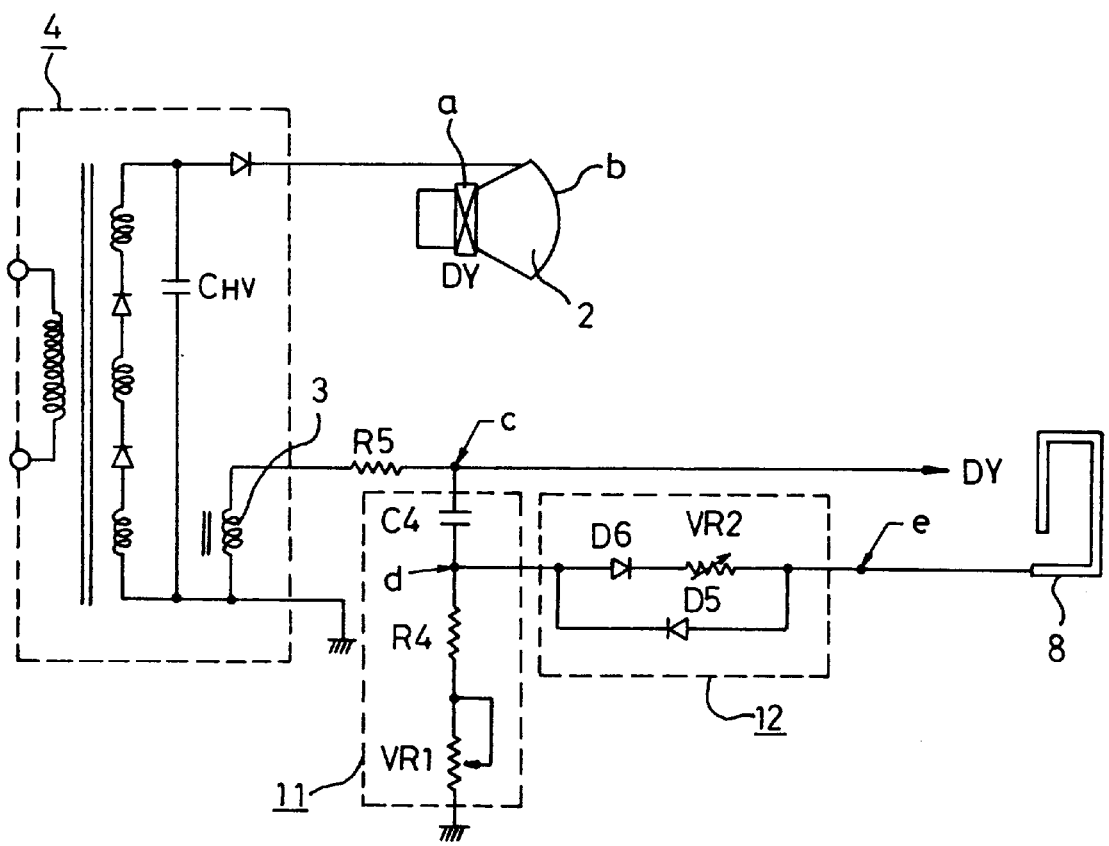
FIG. 4 is a diagram illustrating a circuit for eliminating radiated electric field noise in a video appliance according to another embodiment of the present invention.

FIG. 4 illustrates a circuit for eliminating radiated electric field noise of the front face of a video appliance according to another embodiment of the present invention.

Referring to FIG. 4, the circuit for eliminating radiated electric field noise of the front face of a video appliance according to another embodiment of the present invention comprises: a flyback transformer 4 for generating a high voltage according to the horizontal driving pulse signal, and supplying the high voltage signal to an anode of a CRT 2 to induce a negative polarity pulse signal from an induction coil 3 wound at a predetermined number around the cylindrical core 6 of the flyback transformer 4; an amplitude control section 11 for differentiating the negative polarity pulse signal applied from the induction coil 3 of the flyback transformer 4, and controlling the differentiated negative polarity pulse signal to have the same amplitude as that of the radiated electric field noise generated from the front face of the CRT 2; a high voltage ripple offset section 12 for correcting the waveform of the negative polarity pulse signal inputted by the amplitude control section 11 to have the same phase as that of the ripple component of the radiated electric field induced to the front face of the CRT 2; and a lead wire 8 for offsetting the radiated electric field noise generated from the front face of the CRT 2 according to the negative polarity pulse signal of the high voltage ripple offset section 12.

The amplitude control section 11 comprises a capacitor C4 for differentiating the negative polarity pulse signal inputted from the induction coil 3 and a resistor R4, which are connected to a resistor R5. A variable resistor VR1 is connected to the other end of the resistor R4 for adjusting the amplitude of the negative polarity pulse signal.

The high voltage ripple offset section 12 comprises a diode D6 connected between the capacitor C4 of the amplitude control section 11 and the resistor R4. A variable resistor VR2 for variably adjusting the phase of the negative polarity pulse signal is connected to a cathode terminal of the diode D6, and a diode D5 is connected in parallel to each end of the variable resistor VR2 and the diode D6. A lead wire 8 is connected to the crossing point of the anode of the variable resistor VR2 and the diode D5.

The lead wire 8 is wound at least once along the external periphery of the CRT 2, adjacent to which a bezzle section is positioned, with no closed-loop being formed. A deflection coil DY is connected to one end of the resistor R5.

Operation of the circuit constituted above according to another embodiment of the present invention will now be explained with reference to FIG. 5A.

Figure 5A:
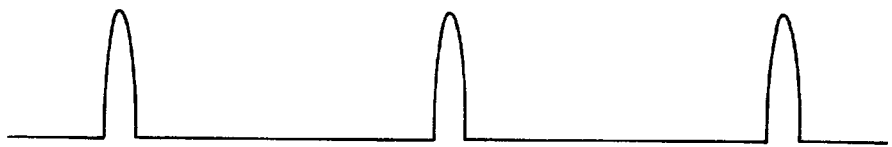
FIGS. 5A to 5E are diagrams illustrating waveforms of the output from each section of the circuit in FIG. 4.

If a power supply is applied to the primary winding at the flyback transformer 4 according to the horizontal driving pulse signal as illustrated in FIG. 5A, the flyback transformer 4 induces and applies a high voltage to the anode of the CRT 2 via the high voltage capacitor $C_{HV}$. The CRT 2 subsequently performs an operation of displaying a video signal by utilizing deflecting nature of the electron beams of the deflection yoke DY.

Figure 5B:
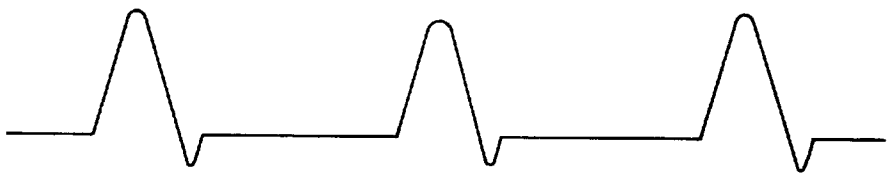

If the capacitance value of the high voltage capacitor $C_{HV}$ is infinite, the high voltage has only a predetermined DC value with no ripple component. In actual fact, however, a capacitance value of the capacitor $C_{HV}$ is present. Thus, the high voltage of the flyback transformer contains a ripple component in addition to the DC component when applied to the anode of the CRT 2. Accordingly, radiated electric field noise of several hundred mV is induced on the front face of the CRT 2 as a pulse having the waveform as illustrated in FIG. 5B. Also, if electric current flows through the deflection coil formed at the neck of the CRT 2, and the deflection yoke DY operates, the radiated electric field noise is emitted to the side and rear faces of the CRT 2 as illustrated in FIG. 5B.

Figure 5C:
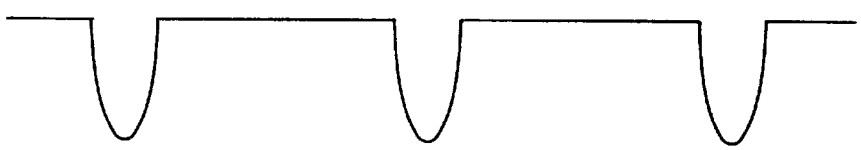

At the same time, however, the induction coil 3 wound at the secondary winding of the flyback transformer 4 induces the negative polarity pulse signal, the phase of which is opposite to that of the waveform of the radiated electric field noise induced to the CRT 2, as illustrated in FIG. 5C, and inputs the negative polarity pulse signal to deflection yoke and the capacitor C4 of the amplitude control section 11. The negative polarity pulse signal of the induction coil 3 applied to the deflection yoke DY subsequently offsets the radiated electric field noise induced by the deflection yoke DY, thereby resulting in a zero voltage ("0"V). Thus, it becomes possible to completely eliminate the radiated electric field noise which is also induced to the side and rear faces of the CRT 2.

Figure 5D:
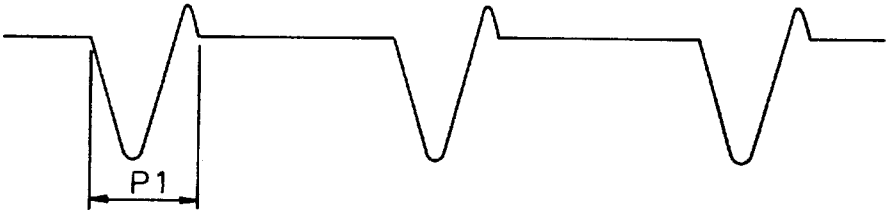

The negative polarity pulse signal inputted to the capacitor C4 of the amplitude control section 11 is differentiated by the capacitor C4 and the resistor R4. The differentiated waveform is inputted to the diodes D5, D6 of the high voltage ripple offset section 12, as illustrated in FIG. 3D, as a waveform of an opposite polarity (FIG. 5D) to that of the radiated electric field noise generated on the front face of the CRT 2 (FIG. 5B). The amplitude of the differentiate waveform can be adjusted by adjusting the variable resistor VR1 of the amplitude control section 11 to be the same as that of the waveform generated on the front face of the CRT 2.

Figure 5E:
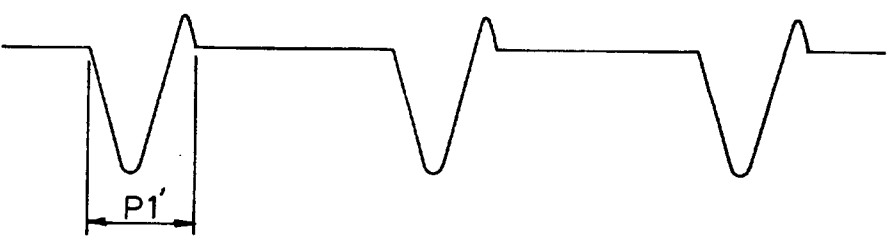

The negative polarity pulse signal having the same phase P1' inputted to the diodes D5, D6 of the high voltage ripple offset section 12 as that illustrated in FIG. 5E is inputted to the lead wire 8 as a waveform illustrated in FIG. 5E. The negative polarity pulse signal inputted to the lead wire 8 has the same phase as that of the radiated electric field noise generated from the front face of the CRT 2. The phase P1' of the negative polarity pulse signal inputted to the lead wire 8 as illustrated in FIG. 5E can be adjusted by adjusting the variable resistor VR2 of the high voltage ripple offset section 12. Thus, the negative polarity pulse signal of the amplitude and phase which is the same as that of the radiated electric field noise generated from the front face of the CRT 2 is added to the front face of the CRT 2, thereby offsetting the radiated electric field noise.

In other words, the negative polarity pulse signal induced by the offset coil 3 is adjusted by the amplitude control section 11 and the high voltage ripple offset section 12 to have the same amplitude and phase as those of the radiated electric field noise generated from the front face of the CRT 2. The lead wire 8 applies the negative polarity pulse signal to offset the radiated electric field noise generated from the front face of the CRT 2.

As described above, the present invention provides a complete offset of the radiated electric field noise generated from the front face of the CRT by variably adjusting and applying a pulse signal, which has opposite amplitude and phase to those of the radiated electric field noise formed from the front face of the CRT. This leads to a considerable improvement in shielding the electronic wave as well as to a notable reduction of the electronic wave generated around the periphery of the monitor, thereby maintaining optimal conditions for maintaining highest degree of purity of a video appliance.

What is claimed is:

1. A circuit for eliminating radiated electric field noise in a video appliance that generates a high voltage through a flyback transformer (FBT) to supply the high voltage to an anode of a cathode ray tube (CRT), and induces a negative polarity pulse signal from a FBT induction coil wound a predetermined number of times around a FBT core, the circuit comprising:

a high voltage ripple offset section including a cylindrical core, wherein a high voltage lead wire of the FBT passes through the cylindrical core, for eliminating a ripple component of the high voltage applied to the anode of the CRT according to the negative polarity pulse signal from the FBT induction coil; and an electric field noise offset section operable to offset the radiated electric field noise generated from the front face of the CRT by applying the negative polarity pulse signal to the periphery of the CRT.

2. A circuit of claim 1, wherein the high voltage ripple offset section comprises voltage division coils connected between one end of the FBT induction coil and an offset coil of the cylindrical core for adjusting amplitude of the negative polarity pulse signal.

3. A circuit of claim 1, wherein the electric field noise offset section differentiates the negative polarity pulse signal and adjusts amplitude of the negative polarity pulse signal, and adjusts phase of the negative polarity pulse signal by controlling gain of the adjusted amplitude.

4. A circuit of claim 1, wherein a ripple offset coil is wound around the cylindrical core through which the FBT lead wire passes.

5. A circuit for eliminating an electric field noise in a video display appliance that generates a high voltage through a flyback transformer (FBT) to supply the high voltage to an anode of a cathode ray tube (CBT), and induces a negative polarity pulse signal from a FBT induction coil wound a predetermined number of times around a FBT core, the circuit comprising:

a high voltage ripple offset section including a cylindrical core, wherein a high voltage lead wire of the FBT passes through the cylindrical core, for eliminating a ripple component of the high voltage applied to the anode of the CRT by adding the negative polarity pulse signal from the FBT induction coil; and an electric field noise offset section operable to offset the radiated electric field noise generated from the front face of the CRT by applying the negative polarity pulse signal to a lead wire extending around the periphery of the CRT.

6. A circuit of claim 5, wherein the high voltage ripple offset section comprises voltage division coils connected between one end of the FBT induction coil and an offset coil of the cylindrical core for adjusting amplitude of the negative polarity pulse signal.

7. A circuit of claim 5, wherein the electric field noise offset section includes a differentiation circuit for differentiating the negative polarity pulse signal to adjust amplitude of the negative polarity pulse signal, and a phase adjusting circuit for adjusting phase of the negative polarity pulse signal.

8. A circuit of claim 7, wherein the phase adjusting circuit comprises a variable resistor for adjusting the phase of the negative polarity pulse signal.

9. A circuit of claim 5, wherein the lead wire applying the negative polarity pulse signal is wound at least once in an open loop.

10. A circuit of claim 5, wherein the lead wire applying the negative polarity pulse signal is positioned along the external periphery of a bezzle section which is adjacent to the front face of the CRT.

11. A circuit of claim 1 wherein the lead wire applying the negative polarity pulse signal is wound at least once in an open loop.

12. A circuit of claim 1, wherein the lead wire applying the negative polarity pulse signal is positioned along the external periphery of a bezzle section which is adjacent to the front face of the CRT.

* * * * *